United States Patent [19]

Pitchford

[11] 4,206,985
[45] Jun. 10, 1980

[54] FILMSTRIP PROJECTOR TAKE-UP

[75] Inventor: Richard L. Pitchford, Wappingers Fall, N.Y.

[73] Assignee: The Singer Company, Stamford, Conn.

[21] Appl. No.: 13,865

[22] Filed: Feb. 22, 1979

[51] Int. Cl.² .............................................. G03B 21/00
[52] U.S. Cl. .................... 353/68; 353/DIG. 2
[58] Field of Search .............. 353/26 R, DIG. 2, 68, 353/95; 242/71.1, 197; 352/78

[56] References Cited

U.S. PATENT DOCUMENTS

| 1,704,814 | 3/1929 | Wellman | 353/DIG. 2 X |
|---|---|---|---|
| 1,893,359 | 1/1933 | Davidson | |
| 2,243,160 | 5/1941 | Koehl | |
| 2,301,415 | 11/1942 | Koehl | |
| 2,330,709 | 9/1943 | Harper et al. | |
| 2,364,381 | 12/1944 | Mihalyi | |
| 2,856,812 | 10/1958 | Barron | |
| 3,628,856 | 12/1971 | Jungiohana | |
| 3,715,963 | 2/1973 | LeCover | |
| 3,771,687 | 11/1973 | Krtous | |
| 3,953,120 | 4/1976 | Badalich et al. | |
| 4,060,210 | 11/1977 | Norris | |
| 4,068,809 | 1/1978 | Koester | |
| 4,093,142 | 6/1978 | Mindell | |

FOREIGN PATENT DOCUMENTS 935253  2/1948  France ............................... 353/DIG. 2

Primary Examiner—Harry N. Haroian
Attorney, Agent, or Firm—Charles R. Lewis

[57] ABSTRACT

A cylindrical shaped filmstrip take-up chamber is disclosed having an expandable inside cavity for receiving a varying quantity of coiled filmstrip. A cup-shaped film receiving cover closes the chamber and is both pivotally mounted near the midpoint thereof for selectively allowing access to the inside of the take-up chamber and pivotally retained at the bottom thereof allowing the cover to pivot within the confines of the chamber varying the inside volume of the take-up chamber.

10 Claims, 5 Drawing Figures

FILMSTRIP PROJECTOR TAKE-UP

BACKGROUND OF THE INVENTION

The present invention relates to filmstrip projectors and more particularly to that portion of the projector intended for taking up a quantity of filmstrip having passed through the projector gate.

Projectors of this type are used for projecting images contained on a strip of film. The filmstrip is generally stored in a rolled form and is played out of a supply chamber in the projector, through a projection gate where light from a light source impinges the filmstrip, and into a take-up chamber. In one form, U.S. Pat. No. 2,301,415 of Koehl discloses a filmstrip projector in which spring clips are used in the take-up for urging the filmstrip into a coil. As the quantity of coiled filmstrip increases, the spring clips yield allowing the filmstrip coil to grow in diameter alleviating any binding that might occur otherwise. In another form, U.S. Pat. No. 3,628,856 of Jungjohann discloses a filmstrip projector having a spring biased pivoted member for urging the filmstrip into a coil. This member acts similarly as the spring clips described above.

SUMMARY OF THE INVENTION

An object of this invention is to provide a filmstrip projector in which the film take-up chamber yieldingly urges the filmstrip into a coil.

Another object of this invention is to provide a filmstrip projector in which the film take-up chamber offers easy access to the coiled filmstrip contained therein.

The above objects are achieved in a filmstrip projector in which the film take-up chamber is provided with a cup-shaped cover. The cover is selectively positionable first in an open position allowing access to the take-up chamber and second in a range of closed positions which effectively varies the internal volume of the take-up chamber. The cover is biased toward the inside of the take-up chamber such that as the quantity of filmstrip fed into the chamber increases, the resultant growing coil of filmstrip moves the cover outwardly within the range of closed positions until the cover is substantially congruent with the opening of the chamber.

DESCRIPTION OF THE DRAWINGS

With the above and additional objects and advantages in mind as will hereinafter appear, the invention will be described with reference to the accompanying drawing in which.

DESCRIPTION OF THE PREFERRED EMBODIMENT

Figure 1:
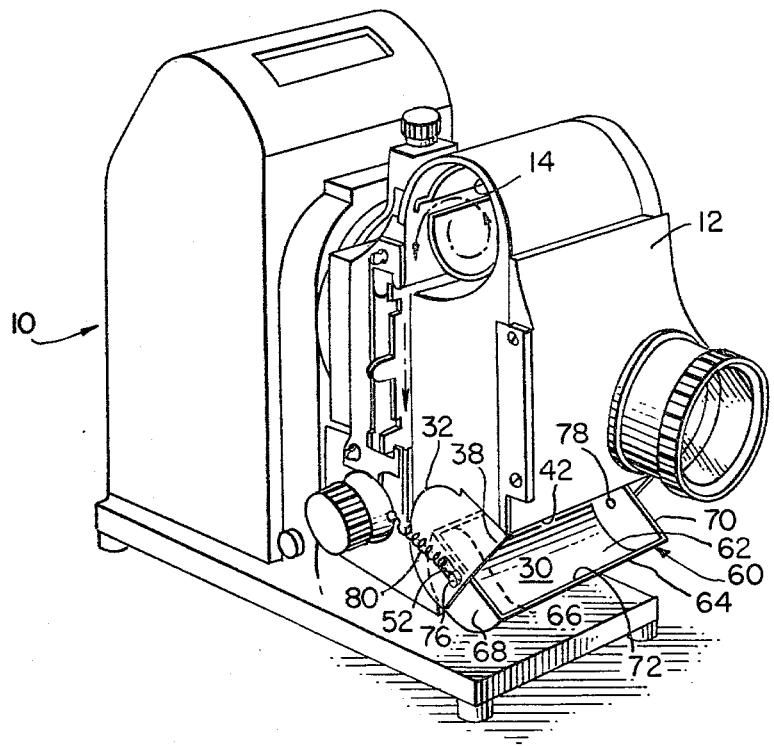
FIG. 1 is a front perspective view of a filmstrip projector having the invention incorporated therein in the open position thereof.

In FIG. 1 there is illustrated a filmstrip projector 10. The projector 10 includes a frame 12, a filmstrip supply chamber 14 and a sprocket 16 for selectively advancing a filmstrip A. The sprocket 16 moves the filmstrip A through a track 18 to a projection gate 20 at which point light, emitting from a light source 22, passes through the filmstrip A projecting the images contained thereon onto a viewing screen (not shown). After leaving the projection gate 20, the filmstrip A continues along the track 18 and enters and is coiled and collected within a take-up chamber 30 in which the present invention is incorporated.

Figure 2:
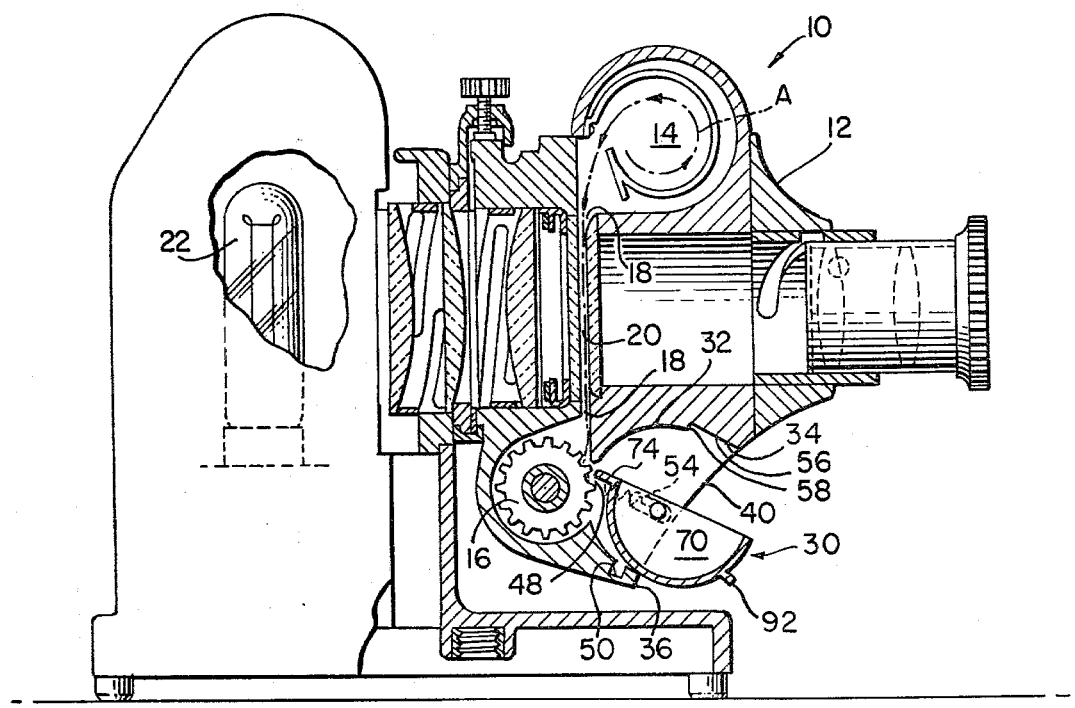
FIG. 2 is a cross-sectional view of the projector.
Figure 3:
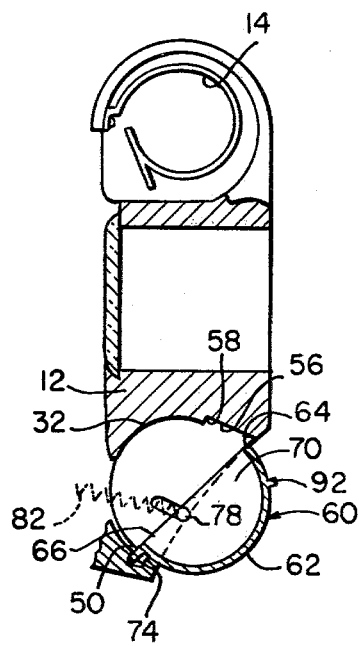
FIG. 3 is a cross-sectional view of the invention as in FIG. 2 showing the cover in the outermost closed position therof.
Figure 4:
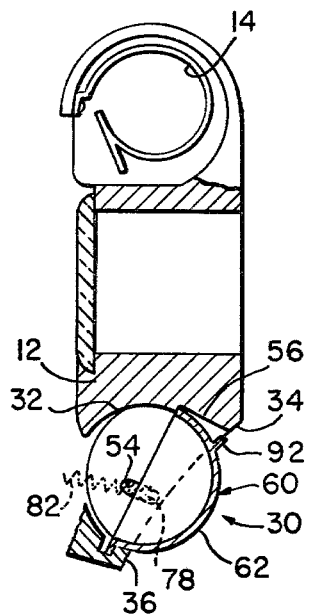
FIG. 4 is a cross-sectional view of the invention as in FIG. 2 showing the cover in the innermost closed position therof.

The take-up chamber 30 is formed in the projector frame 12 and has a cylindrical shaped wall 32 terminating in an upper edge 34 and a lower edge 36, and a pair of parallel side walls 38 and 40. The edges 34 and 36 and the side walls 38 and 40 define an opening 42. The wall 32 of the chamber 30 is formed with a transverse slot 48 near the sprocket 16 through which the filmstrip A enters the chamber 30. The wall 32 of the chamber 30 is further formed with an aperture 50 located adjacent to the lower edge 36 of the wall 32 and below the slot 48 as viewed in FIGS. 2, 3, and 4. Elongated apertures 52 and 54 are formed in the respective sidewalls 38 and 40 near the midpoint of and adjacent to the opening 42 and have the major axes thereof substantially normal to the opening 42. A recessed area 56 is formed in the wall 32 of the chamber 30 at the upper edge 34 of the wall 32 on the inside thereof and extends rearwardly terminating in an abutment 58.

The take-up chamber 30 further includes a cover 60 having a cylindrical shaped wall 62 terminating in edges 64 and 66, and a pair of parallel side walls 68 and 70. The edges 64 and 66 and the side walls 68 and 70 define an opening 72. The edge 66 of the cover 60 is formed with a depending tab 74 for pivotally engaging the aperture 50 in the wall 32 of the chamber 30. The cover 60 is of such a size that when the tab 74 engages the aperture 50, the cover 60 may enter the opening 42 until the edge 64 engages the abutment 58 (see FIG. 4). A pair of pivot pins 76 and 78 are mounted to the side walls 68 and 70 adjacent to the opening 72 in the cover 60 and are located such that the elongated apertures 52 and 54 in the side walls 38 and 40 may be engaged by the pivot pins 76 and 78. The cover 60 is biased inwardly of the chamber 30 by a pair of tension springs 80 and 82 which are stretched between each of the pivot pins 76 and 78 and the projector frame 12 at the rear of the wall 32. An operating handle 92 is attached to the outside of the cover 60 wall 62 near the edge 64 thereof.

In operation, when the take-up chamber 30 is empty, the cover 60 lies within the opening 42 and the tab 74 is in pivotal engagement with the aperture 50 in the wall 32. The springs 80 and 82, acting upon the pivot pins 76 and 78, urge the cover 60 inwardly until the edge 64 of the cover 60 engages the abutment 58 in the wall 32 (see FIG. 4). When the filmstrip A enters the take-up chamber 30 through the slot 48, the filmstrip A engages the cover 60 wall 62 and is forced to coil within the chamber 30 due to the shape of the cover 60 wall 62 and the wall 32. As an increasing amount of filmstrip A is inserted into the chamber 30, the coiled filmstrip A tends to grow in diameter forcing the cover 60 to pivot outwardly about the tab 74. Consequently, the pivot pins 76 and 78 move outwardly in the elongated apertures 52 and 54 against the bias of the springs 80 and 82 until the pivot pins 76 and 78 engage the ends of the apertures 52 and 54 and the cover 60 is substantially congruent with the opening 42 (see FIG. 3). To remove the accumulated filmstrip A, the handle 92 is moved downwardly, pivoting the cover 60 about the pivot pins 76 and 78 and releasing the tab 74 from the aperture 50 (see FIGS. 1 and 2). The coiled filmstrip A, which has been gathered up within the cover 60, may now be easily removed.

Figure 5:
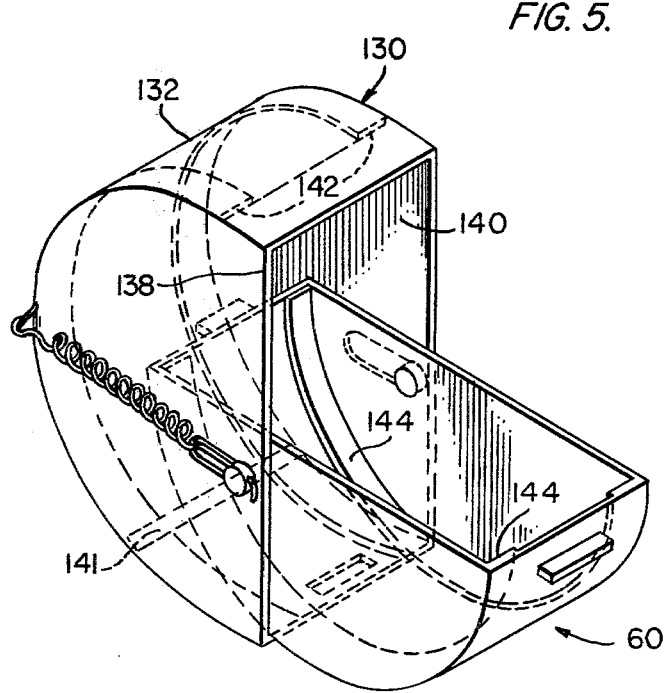
FIG. 5 is a front perspective view of another embodiment of the invention.

In FIG. 5 there is illustrated a second embodiment of the invention in which the filmstrip take-up is in the form of a cartridge separable from the projector. In this embodiment, the take-up includes a housing 130 having a cylindrical shaped wall 132 and a pair of parallel side walls 138 and 140. A transverse opening 141 is formed in the cylindrical shaped wall 132 through which a filmstrip may enter the cartridge. The cover 60 is pivotally mounted to the housing 130 and operates in a manner identical to that described above. Also included in this embodiment are film guide surfaces 142 and 144 located adjacent the side walls of the housing 130 and the cover 60, respectively. The guide surfaces 142 and 144 serve to space a filmstrip from the surface of the housing 130 wall 132 and the cover 60 wall 62 thereby preventing contact of the image containing portion of a filmstrip therewith.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

I claim:

1. In a filmstrip projector having a frame, a projection gate, means for advancing a filmstrip through said projection gate, and means for projecting light through said projection gate, a filmstrip take-up comprising:
   a chamber having an opening therein for removing said filmstrip, said chamber including a wall having a transverse slot formed therein through which said filmstrip may enter said chamber;
   a cover for closing said chamber opening, said cover being selectively positionable in both an open position, allowing access to the inside of said chamber through said opening, and a range of closed positions, said range of closed positions extending from a position in which the opening of said cover is substantially congruent with said chamber opening, to a position in which opening of said cover lies within the confines of said chamber;
   a first means for pivotally mounting said cover to said chamber allowing movement of said cover in said range of closed positions; and
   a second means for pivotally mounting said cover to said chamber allowing movement of said cover between said open position and said range of closed positions.

2. The filmstrip take-up as set forth in claim 1 which further includes biasing means for urging said cover toward the inside of said chamber.

3. The filmstrip take-up as set forth in claims 1 or 2 wherein said first pivotal mounting means comprises said chamber wall being formed with an aperture therein and said cover having a tab formed on one edge thereof for pivotally engaging said aperture in said chamber wall.

4. The filmstrip take-up as set forth in claim 3 wherein said chamber further includes a pair of parallel side walls depending from opposite sides of said chamber wall.

5. The filmstrip take-up as set forth in claim 4 wherein said cover is formed with a pair of parallel side walls.

6. The filmstrip take-up as set forth in claim 5 wherein said second pivotal mounting means comprises each of said chamber side walls being similarly formed with an elongaged aperture having the major axis thereof substantially normal to said chamber opening and each of said cover side walls having a pivot pin mounted thereon for engaging each of said elongated apertures define said range of closed positions.

7. The filmstrip take-up as set forth in claim 6 in which said biasing means comprises a pair of tension springs stretched between said pivot pins and the rear of said chamber, whereby said pivot pins are urged toward the ends of said elongaged apertures moving said cover toward the inside of said chamber.

8. The filmstrip take-up as set forth in claim 2 which further comprises an abutment formed in said chamber wall for engaging and limiting the inward travel of said cover within said chamber.

9. The filmstrip take-up as set forth in claim 1 which further includes guide means formed in said chamber wall and in said cover for engaging the edges of the filmstrip and preventing the image containing portions of the filmstrip from touching said chamber wall or said cover.

10. The filmstrip take-up as set forth in claim 1 wherein said cover is formed with a pair of parallel sidewalls and wherein said second pivotal mounting means comprises said cover sidewalls each having a pivot pin mounted therein and means for engaging said pivot pins, said engaging means being capable of allowing said pivot pins to shift within said range of closed positons.

* * * * *